United States Patent
Yamashita

(10) Patent No.: US 10,359,144 B2
(45) Date of Patent: Jul. 23, 2019

(54) METHOD OF MANUFACTURING VACUUM INSULATION PANEL AND INTERMEDIATE PRODUCT

(71) Applicant: TOYOTA JIDOSHA KABUSHIKI KAISHA, Toyota-shi (JP)

(72) Inventor: Osamu Yamashita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/722,517

(22) Filed: Oct. 2, 2017

(65) Prior Publication Data

US 2018/0112813 A1  Apr. 26, 2018

(30) Foreign Application Priority Data

Oct. 25, 2016  (JP) .................................. 2016-208849

(51) Int. Cl.
  *F16L 59/065*  (2006.01)
  *B22C 9/00*  (2006.01)
  *E04B 1/80*  (2006.01)

(52) U.S. Cl.
  CPC .............. *F16L 59/065* (2013.01); *B22C 9/00* (2013.01); *E04B 1/803* (2013.01); *Y10T 428/231* (2015.01)

(58) Field of Classification Search
  CPC .... Y10T 428/231; F16L 59/065; E04B 1/803; F25D 2201/14; Y02B 80/12
  See application file for complete search history.

(56) References Cited

U.S. PATENT DOCUMENTS

| | | | |
|---|---|---|---|
| 8,475,576 B2 * | 7/2013 | Markowz | B01J 20/041 96/108 |
| 2009/0090242 A1 * | 4/2009 | Hashida | F16L 59/065 95/101 |
| 2010/0242735 A1 | 9/2010 | Hashida et al. | |
| 2010/0263330 A1 | 10/2010 | Hashida et al. | |
| 2010/0263539 A1 | 10/2010 | Hashida et al. | |
| 2010/0263540 A1 | 10/2010 | Hashida et al. | |
| 2013/0291733 A1 | 11/2013 | Koshiyama et al. | |
| 2013/0305928 A1 | 11/2013 | Kojima et al. | |

FOREIGN PATENT DOCUMENTS

| | | |
|---|---|---|
| CN | 101799100 A | 8/2010 |
| CN | 103338832 A | 10/2013 |
| EP | 1 903 271 A1 | 3/2008 |
| EP | 2 666 534 A1 | 11/2013 |
| JP | 2008-82534 | 4/2008 |
| JP | 2009-52649 A | 3/2009 |
| JP | 4829172 | 12/2011 |
| JP | WO 2012/111267 A1 | 7/2014 |
| JP | 5591149 | 9/2014 |

* cited by examiner

*Primary Examiner* — Alexander S Thomas
(74) *Attorney, Agent, or Firm* — Oblon, McClelland, Maier & Neustadt, L.L.P.

(57) ABSTRACT

An intermediate product for a vacuum insulation panel includes an outer covering member having a sealed space, a core material disposed in the sealed space and having heat insulation properties, and a first gas absorbent disposed in the sealed space, sealed by a container having gas barrier properties and absorbing a first specific gas, wherein the first specific gas is sealed in the sealed space, and an unsealing member configured to unseal the container when a pressing force is applied from an outside is attached to the container.

4 Claims, 7 Drawing Sheets

METHOD OF MANUFACTURING VACUUM INSULATION PANEL AND INTERMEDIATE PRODUCT

INCORPORATION BY REFERENCE

The disclosure of Japanese Patent Application No. 2016-208849 filed on Oct. 25, 2016 including the specification, drawings and abstract is incorporated herein by reference in its entirety.

BACKGROUND

1. Technical Field

The present disclosure relates to a method of manufacturing a vacuum insulation panel and an intermediate product.

2. Description of Related Art

A vacuum insulation panel in which a core material having heat insulation properties such as glass fibers is disposed in a sealed space sandwiched between a pair of panel members and the sealed space is vacuum-sealed is known. Japanese Patent Application Publication No. 2008-082534 (JP 2008-082534 A) discloses a vacuum insulation panel in which a pair of panel members having a plurality of concave sections and convex sections are disposed such that convex sections protrude in opposite directions and the convex sections are connected to each other, a core material is disposed in a sealed space sandwiched and formed by the concave sections in the panel members, and the sealed space is vacuum-sealed.

SUMMARY

This vacuum insulation panel cannot be easily folded. In the vacuum insulation panel disclosed in JP 2008-082534 A, since the pair of panel members are connected to each other at the convex sections, the vacuum insulation panel can be folded at the convex sections. However, in the vacuum insulation panel disclosed in JP 2008-082534 A, a degree of freedom in construction is decreased because the vacuum insulation panel can be folded only at the convex sections, and it may be difficult to construct the vacuum insulation panel in a desired shape.

Further, in the vacuum insulation panel disclosed in JP 2008-082534 A, during manufacturing, vacuum suctioning by a vacuum pump needs to be performed in order to vacuum-seal the sealed space formed by being sandwiched by the concave sections of the panel members. Since the vacuum suctioning is time-consuming, the manufacturing equipment may be occupied for a long time in manufacturing the vacuum insulation panel.

The present disclosure provides a method of manufacturing a vacuum insulation panel and an intermediate product that allow the vacuum insulation panel to be constructed in a desired shape without manufacturing equipment being occupied for a long time during manufacturing.

The present disclosure provides an intermediate product for a vacuum insulation panel including an outer covering member having a sealed space; a core material disposed in the sealed space and having heat insulation properties; and a first gas absorbent disposed in the sealed space, sealed by a container having gas barrier properties and absorbing a first specific gas, wherein the first specific gas is sealed in the sealed space, and an unsealing member configured to unseal the container when a pressing force is applied from an outside is attached to the container. In the intermediate product for a vacuum insulation panel, the outer covering member has the sealed space. The first specific gas is sealed in the sealed space. In addition, the core material and the first gas absorbent sealed by the container having gas barrier properties and configured to absorb the first specific gas are disposed in the sealed space. When the pressing force is applied to the unsealing member from the outside and the container is unsealed, the first gas absorbent absorbs the first specific gas sealed in the sealed space. In manufacturing of the vacuum insulation panel, when the sealed space is vacuum-suctioned by a vacuum pump or the like, a time during which the manufacturing equipment is occupied becomes long. On the other hand, as the first gas absorbent absorbs the first specific gas sealed in the sealed space when the container is unsealed, the sealed space is exhausted without vacuum suctioning. Accordingly, the vacuum insulation panel can be obtained without the manufacturing equipment being occupied for a long time. In addition, since the intermediate product for a vacuum insulation panel can be easily folded, the intermediate product can be folded in a desired shape to be attached to an object to be heat insulated. For example, if the container is unsealed when the intermediate product for a vacuum insulation panel is attached to the object to be heat-insulated, the sealed space is exhausted in a state in which the intermediate product for a vacuum insulation panel is attached to the object to be heat-insulated. When the first specific gas in the sealed space is sufficiently exhausted by the first gas absorbent, a vacuum insulation panel which is attached to the object to be heat-insulated is obtained. That is, since the intermediate product for a vacuum insulation panel with such a configuration is used in manufacturing, the vacuum insulation panel can be constructed in a desired shape.

The present disclosure provides a method of manufacturing a vacuum insulation panel including sealing a first gas absorbent that absorbs a first specific gas in a container having gas barrier properties; attaching an unsealing member configured to unseal the container to an outer side of the container in which the first gas absorbent is sealed when a pressing force is applied from an outside; forming an intermediate product for a vacuum insulation panel by sealing the container to which the unsealing member is attached and a core material having heat insulation properties in an outer covering member having a sealed space under an atmosphere of the first specific gas; and unsealing the container by applying the pressing force to the unsealing member from the outside when the intermediate product for a vacuum insulation panel is folded in a desired shape. In forming the intermediate product for a vacuum insulation panel, when the container having gas barrier properties in which the first gas absorbent is sealed and to which the unsealing member is attached and the core material are sealed in the outer covering member under an atmosphere of the first specific gas, the first specific gas is sealed in the sealed space in the outer covering member. Since the intermediate product for a vacuum insulation panel formed as above can be easily folded, the intermediate product can be folded in a desired shape and attached to the object to be heat-insulated. When the intermediate product for a vacuum insulation panel is folded in a desired shape, if a pressing force is applied to the unsealing member from the outside and the container having gas barrier properties is unsealed, the first gas absorbent absorbs the first specific gas sealed in the sealed space in the outer covering member. That is, in the intermediate product for a vacuum insulation panel which is folded in a desired shape, the sealed space is exhausted without vacuum suctioning occupying the manufacturing equipment for a long time. Accordingly, the vacuum insulation panel folded in a desired shape can be obtained without the manufacturing equipment being occupied for a long time.

The unsealing member may have a protrusion, and the protrusion may open a hole in the container to allow an inside and an outside of the container to communicate with each other when the pressing force is applied to the outer covering member from the outside.

A second specific gas different from the first specific gas may be sealed in a space in the container sealing the first gas absorbent, and a second gas absorbent configured to absorb the second specific gas and not to absorb the first specific gas may be disposed in the sealed space.

The first specific gas may be oxygen, the first gas absorbent may be an oxygen absorbent, the second specific gas different from the first specific gas may be carbon dioxide gas, and the second gas absorbent that absorbs the second specific gas may be a carbon dioxide gas absorbent.

The first specific gas may be carbon dioxide gas, the first gas absorbent may be carbon dioxide gas absorbent, the second specific gas different from the first specific gas may be oxygen, and the second gas absorbent that absorbs the second specific gas may be an oxygen absorbent.

According to the present disclosure, the vacuum insulation panel can be constructed in a desired shape without the manufacturing equipment being occupied for a long time during manufacturing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment 1

Figure 1:
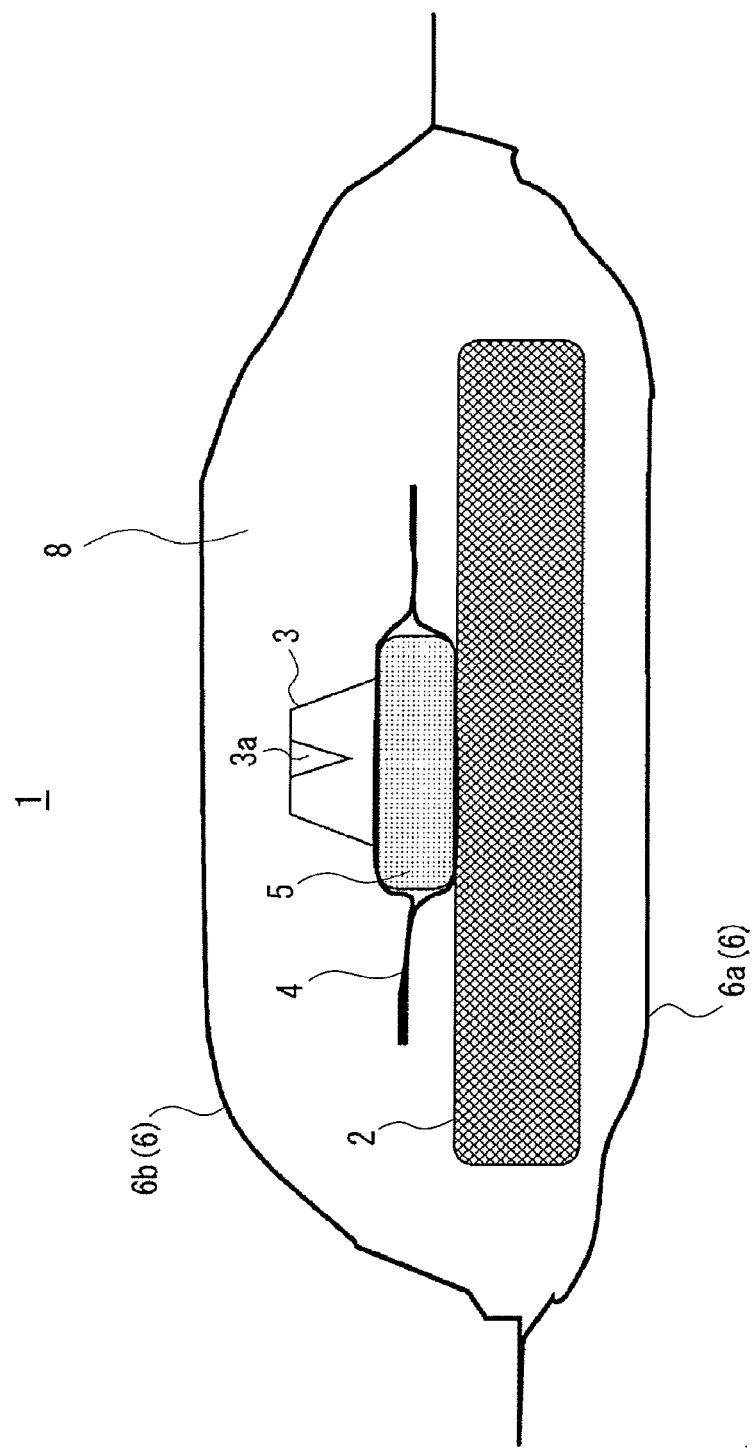
FIG. 1 is a schematic diagram showing a schematic configuration of an intermediate product of a vacuum insulation panel according to Embodiment 1.

Hereinafter, Embodiment 1 of the present disclosure will be described with reference to the accompanying drawings. First, a schematic configuration of an intermediate product 1 of a vacuum insulation panel according to the embodiment will be described with reference to FIG. 1. FIG. 1 is a schematic diagram showing a schematic configuration of the intermediate product 1 for a vacuum insulation panel. As shown in FIG. 1, the intermediate product 1 for a vacuum insulation panel according to the embodiment includes an outer covering member 6, a core material 2, and an oxygen absorbent 5 serving as a gas absorbent.

The outer covering member 6 is constituted by a first outer covering member 6a and a second outer covering member 6b overlaid on the first outer covering member 6a, and a sealed space 8 in which oxygen serving as a specific gas is sealed is provided between the first outer covering member 6a and the second outer covering member 6b. The core material 2 is a member disposed in the sealed space 8 and having heat insulation properties. For example, woven fabric or non-woven fabric such as glass fibers, ceramic fibers, carbon fibers, or the like, a mica plate, ceramic wool, a ceramic plate, porous urethane, or the like, which are formed in a flat plate shape, may be used for the core material 2.

The oxygen absorbent 5 absorbs oxygen serving as a specific gas. The oxygen absorbent 5 is disposed in the sealed space 8 and sealed in a packaging container 4 serving as a container having gas barrier properties. A material of the oxygen absorbent 5 is, for example, iron powder. The packaging container 4 is constituted by, for example, a film in which a polypropylene film, an aluminum foil and low density polyethylene are sequentially laminated.

An unsealing member 3 configured to unseal the packaging container 4 when a pressing force is applied from the outside is attached to the packaging container 4. The unsealing member 3 has, for example, a protrusion 3a formed therein and configured to open a hole in the packaging container 4. When a pressing force is applied to the second outer covering member 6b from the outside, the protrusion 3a opens a hole in the packaging container 4 to allow the inside and the outside of the packaging container 4 to communicate with each other. When the packaging container 4 is unsealed, oxygen sealed in the sealed space 8 is absorbed by the oxygen absorbent 5 and the sealed space 8 is exhausted to obtain a vacuum insulation panel.

Figure 2:
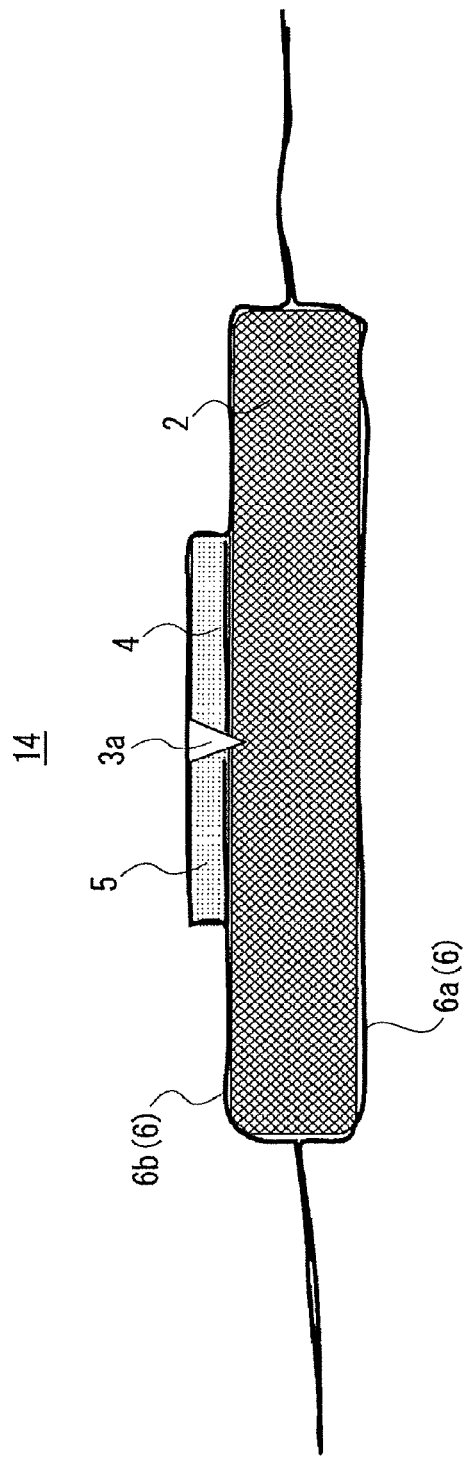
FIG. 2 is a schematic diagram showing a vacuum insulation panel obtained from the intermediate product of a vacuum insulation panel according to Embodiment 1.

FIG. 2 is a schematic diagram showing a vacuum insulation panel 14 obtained by the intermediate product 1 for a vacuum insulation panel. As shown in FIG. 2, in the vacuum insulation panel 14, the tip of the protrusion 3a penetrates the packaging container 4 to reach the oxygen absorbent 5, the first outer covering member 6a adheres to the core material 2, and the second outer covering member 6b adheres to the core material 2 and the oxygen absorbent 5.

In the intermediate product 1 for a vacuum insulation panel shown in FIG. 1, for example, when a volume of oxygen sealed in the sealed space 8 is about 800 cc and there is about 5 g of iron powder serving as the oxygen absorbent 5, it takes about one day until the oxygen in the sealed space 8 is exhausted to obtain the vacuum insulation panel 14 shown in FIG. 2 since the packaging container 4 is unsealed.

Figure 3:
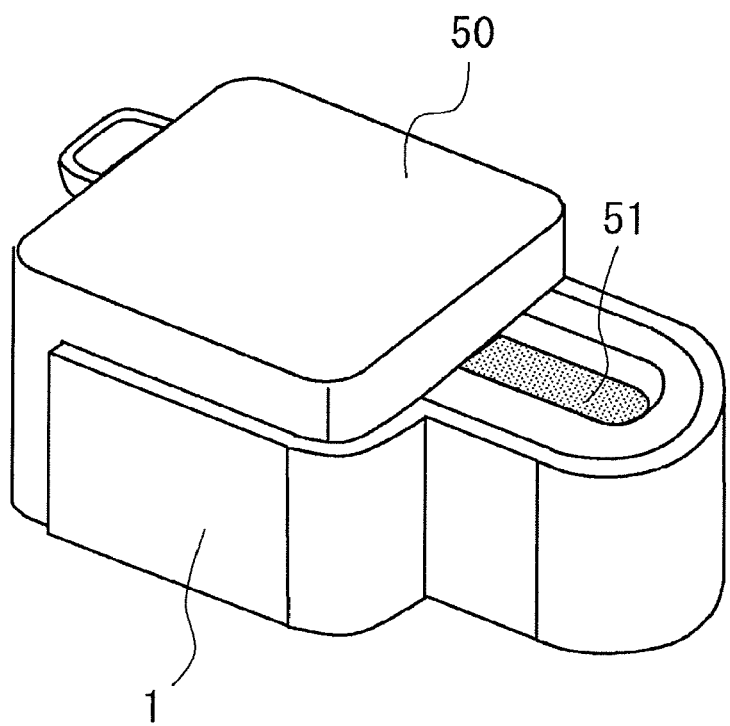
FIG. 3 is a schematic diagram showing a state in which the intermediate product of the vacuum insulation panel according to Embodiment 1 is attached to an object to be heat-insulated.

The vacuum insulation panel 14 shown in FIG. 2 cannot be easily folded. Meanwhile, the intermediate product 1 for a vacuum insulation panel shown in FIG. 1 can be easily folded. FIG. 3 is a schematic diagram showing a state in which the intermediate product 1 for a vacuum insulation panel is attached to a object to be heat-insulated 50. Here, the object to be heat-insulated 50 is, for example, a furnace holding molten metal configured to hold a molten metal 51 which is aluminum therein. As shown in FIG. 3, the intermediate product 1 for a vacuum insulation panel is folded to match a shape of the object to be heat-insulated 50, and the intermediate product 1 for a vacuum insulation panel is attached to the object to be heat-insulated 50. Here, a pressing force is applied from the outside to unseal the packaging container 4 (see FIG. 1) of the intermediate product 1 for a vacuum insulation panel. Accordingly, the intermediate product 1 for a vacuum insulation panel becomes a vacuum insulation panel when oxygen in the sealed space 8 is exhausted while being attached to the object to be heat-insulated 50.

Figure 4:
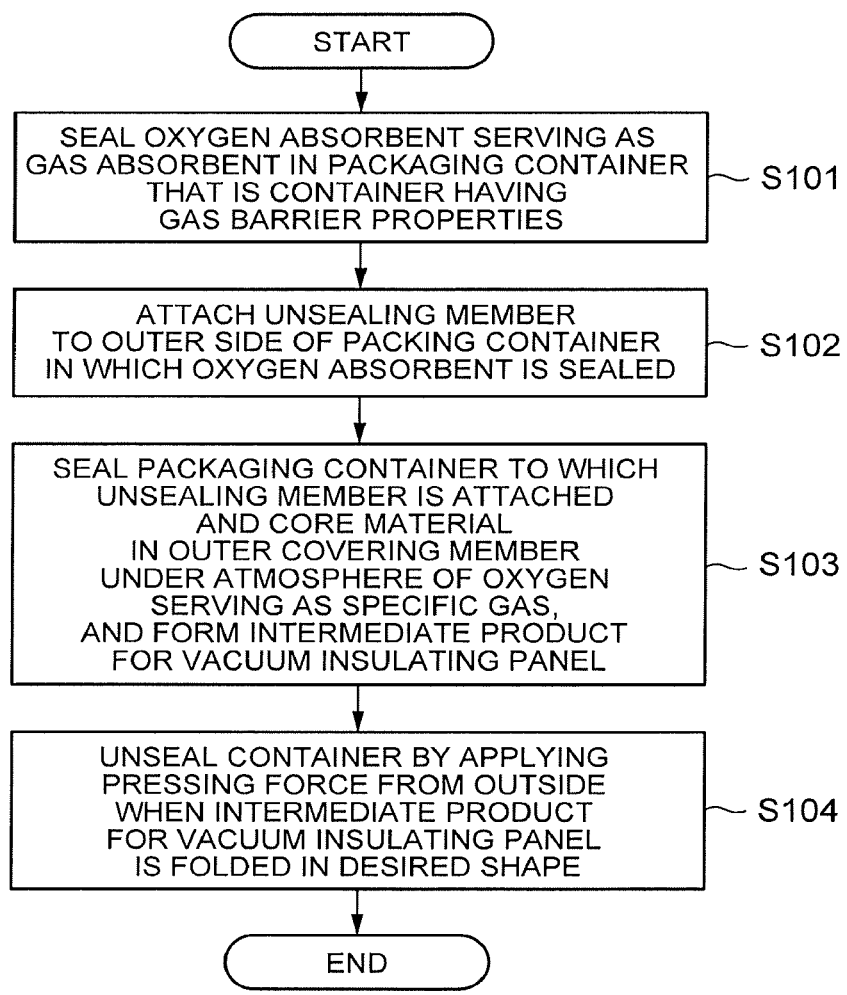
FIG. 4 is a flowchart showing a flow of processing in a method of manufacturing a vacuum insulation panel.

Next, a method of manufacturing a vacuum insulation panel will be described. Further, the following description will also appropriately refer to FIG. 1. FIG. 4 is a flowchart showing a flow of processing in the method of manufacturing the vacuum insulation panel. As shown in FIG. 4, first, the oxygen absorbent 5 serving as a gas absorbent is sealed in the packaging container 4 that is a container having gas barrier properties (step S101). Next, the unsealing member 3 configured to unseal the packaging container 4 when a pressing force is applied from the outside is attached to an outer side of the packaging container 4 (step S102). Next, in an atmosphere of oxygen that is a specific gas, the packaging container 4 to which the unsealing member 3 is attached and the core material 2 are sealed in the outer covering member 6, i.e., a space between the first outer covering member 6a and the second outer covering member 6b overlaid on the first outer covering member 6a, and the intermediate product 1 for a vacuum insulation panel is formed (step S103). Next, when the intermediate product 1 for a vacuum insulation panel is folded in a desired shape, a pressing force is applied from the outside to unseal the packaging container 4 (step S104).

Figure 5:
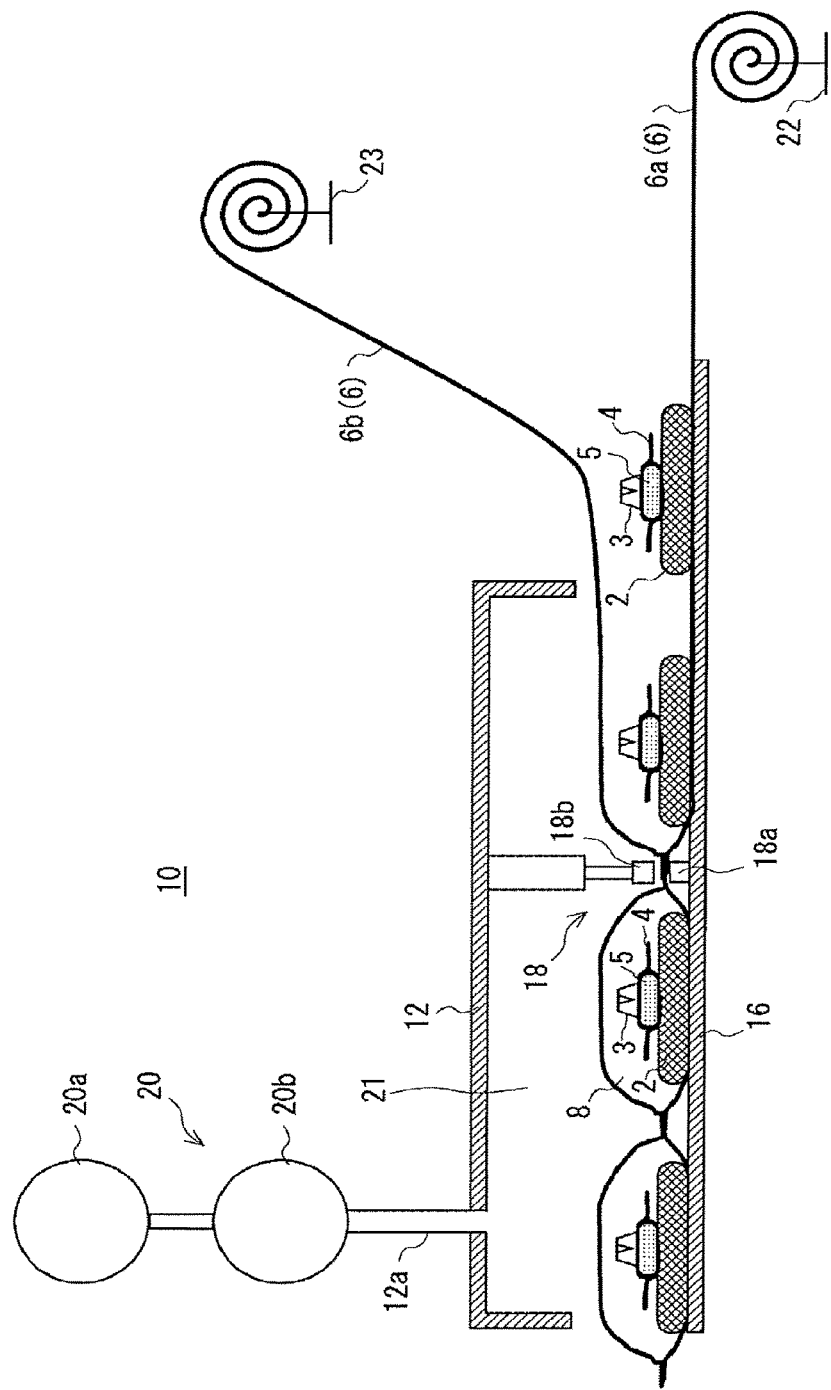
FIG. 5 is a schematic diagram for describing a schematic configuration of manufacturing equipment for forming the intermediate product of the vacuum insulation panel according to Embodiment 1.

FIG. 5 is a schematic diagram for describing a schematic configuration of manufacturing equipment 10 for forming the intermediate product 1 for a vacuum insulation panel. As shown in FIG. 5, the manufacturing equipment 10 includes a base 16, a chamber 12 disposed to face an upper side of the base 16 and configured to form a processing space 21 together with the base 16, a first sheet feeder 22 configured to supply the first outer covering member 6a that constitutes the outer covering member 6, a second sheet feeder 23 configured to supply the second outer covering member 6b that constitutes the outer covering member 6, a thermal sealing machine 18, and an oxygen supply mechanism 20.

The base 16 has a flat surface on which the first outer covering member 6a supplied from the first sheet feeder 22 is disposed. The thermal sealing machine 18 is disposed over the base 16 at an appropriate position in the chamber 12. The thermal sealing machine 18 has a receiving section 18a fixed onto the base 16 and a pressing section 18b disposed to face an upper side thereof and vertically movable. The oxygen supply mechanism 20 has an oxygen cylinder 20a in which oxygen is stored and a regulator 20b configured to regulate a pressure and a flow rate of supplied oxygen. The oxygen supply mechanism 20 is connected to a port 12a installed in the chamber 12, and supplies oxygen to the processing space 21 formed by the chamber 12 and the base 16.

The core material 2 is disposed on the first outer covering member 6a disposed on the base 16, the oxygen absorbent 5 sealed in the packaging container 4 is disposed on the core material 2, and further, the unsealing member 3 is attached to an outer side of the packaging container 4. In the processing space 21, the second outer covering member 6b supplied from the second sheet feeder 23 is disposed over the unsealing member 3. When the pressing section 18b heated in the thermal sealing machine 18 is moved downward to press the pressing section 18b against the receiving section 18a, the first outer covering member 6a and the second outer covering member 6b that are disposed between the receiving section 18a and the pressing section 18b are thermally sealed. Accordingly, the sealed space 8 in which the core material 2 and the oxygen absorbent 5 are disposed is formed between the first outer covering member 6a and the second outer covering member 6b. As described above, oxygen is supplied into the processing space 21 formed between the chamber 12 and the base 16 by the oxygen supply mechanism 20. For this reason, oxygen is sealed in the sealed space 8. The intermediate product 1 for a vacuum insulation panel is formed as described above.

In forming the intermediate product 1 for a vacuum insulation panel, the oxygen absorbent 5 is previously sealed in the packaging container 4. Specifically, the oxygen absorbent 5 is disposed in the packaging container 4 in an atmosphere of oxygen serving as a specific gas, and the packaging container 4 is sealed by thermal sealing. Further, the manufacturing equipment 10 shown in FIG. 5 may be used as manufacturing equipment for sealing the oxygen absorbent 5 in the packaging container 4.

Figure 6:
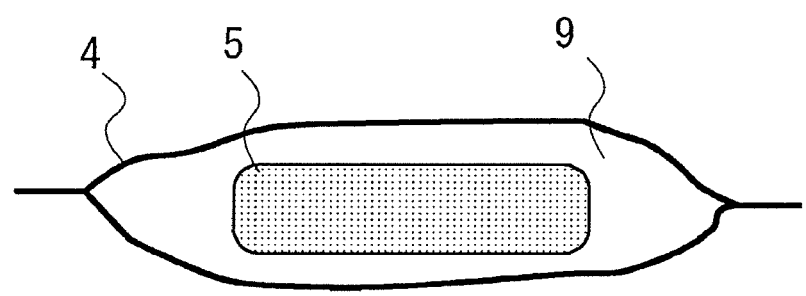
FIG. 6 is a schematic diagram showing a state immediately after a packaging container in which an oxygen absorbent is disposed is sealed.

FIG. 6 is a schematic diagram showing a state immediately after the oxygen absorbent 5 is sealed in the packaging container 4. As shown in FIG. 6, oxygen is sealed in a space 9 in a container serving as a space sealed between the packaging container 4 and the oxygen absorbent 5. Since the oxygen absorbent 5 absorbs oxygen sealed in the space 9 in the container between the packaging container 4 and the oxygen absorbent 5, the oxygen absorbent 5 can be vacuum-sealed in the packaging container 4 without vacuum suction. The oxygen absorbent 5 needs to be of sufficient volume to absorb the oxygen present in the space 9 in the container and the sealed space 8 (see FIG. 1).

As described above, in the intermediate product 1 for a vacuum insulation panel shown in FIG. 1, oxygen is sealed in the sealed space 8 between the first outer covering member 6a and the second outer covering member 6b. In addition, the oxygen absorbent 5 sealed by the packaging container 4 serving as a container having gas barrier properties is disposed in the sealed space 8 together with the core material 2. When the packaging container 4 to which a pressing force is applied from the outside via the second outer covering member 6b is unsealed, the oxygen absorbent 5 absorbs oxygen sealed in the sealed space 8. In manufacturing of the vacuum insulation panel, when the sealed space 8 is vacuum-suctioned by a vacuum pump or the like, the time during which the manufacturing equipment is occupied is long. On the other hand, when the oxygen absorbent 5 absorbs oxygen sealed in the sealed space 8 when the packaging container 4 is unsealed, the sealed space 8 is exhausted without evacuation.

It takes about one day to obtain the vacuum insulation panel after the packaging container 4 is unsealed and oxygen in the sealed space 8 is sufficiently exhausted. However, since the vacuum insulation panel is obtained when the intermediate product 1 for a vacuum insulation panel is left while being attached to the object to be heat-insulated 50, the manufacturing equipment is not occupied for a long time in manufacturing. Accordingly, the vacuum insulation panel can be obtained without the manufacturing equipment being occupied for a long time.

In addition, since the intermediate product 1 for a vacuum insulation panel can be easily folded, the intermediate product 1 for a vacuum insulation panel can be folded in a desired shape and attached to match the exterior shape of the object to be heat-insulated 50 (see FIG. 3). If the packaging container 4 is unsealed when the intermediate product 1 for a vacuum insulation panel is attached to the object to be heat-insulated 50, the sealed space 8 is exhausted by the oxygen absorbent 5 in a state in which the intermediate product 1 for a vacuum insulation panel is attached to the object to be heat-insulated 50. When the oxygen in the sealed space 8 is sufficiently exhausted by the oxygen absorbent 5, the vacuum insulation panel in a state of being attached along the exterior shape of the object to be heat-insulated 50 is obtained. That is, since the intermediate product 1 for a vacuum insulation panel is attached to match the exterior shape of the object to be heat-insulated 50 and a pressing force is applied from the outside during attachment to unseal the packaging container 4, the vacuum insulation panel can be constructed in a desired shape.

Embodiment 2

Hereinafter, Embodiment 2 of the present disclosure will be described with reference to the accompanying drawings. Further, components the same as in Embodiment 1 are designated by the same reference numerals and description thereof will be omitted. First, a schematic configuration of an intermediate product 101 for a vacuum insulation panel according to the embodiment will be described with reference to FIG. 7.

Figure 7:
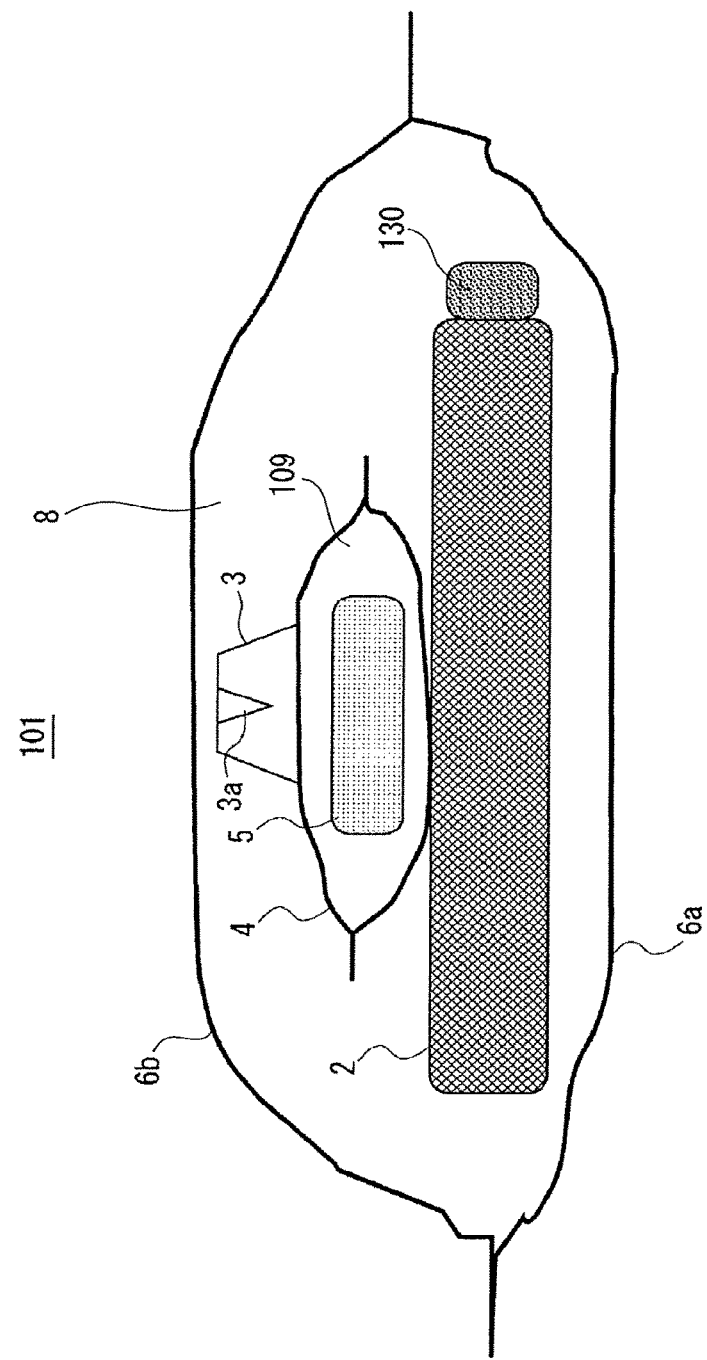
FIG. 7 is a schematic diagram showing a schematic configuration of an intermediate product of a vacuum insulation panel according to Embodiment 2.

FIG. 7 is a schematic diagram showing a schematic configuration of the intermediate product 101 for a vacuum insulation panel. As shown in FIG. 7, the configuration of the intermediate product 101 for a vacuum insulation panel is basically the same as the intermediate product 1 for a vacuum insulation panel described using FIG. 1 in Embodiment 1. There are two differences from the intermediate product 1 for a vacuum insulation panel according to Embodiment 1. A first difference is that carbon dioxide gas serving as a second specific gas different from oxygen serving as a specific gas is sealed in a space 109 in a container between the packaging container 4 and the oxygen absorbent 5 (a space 109 in the packaging container 4 sealing the oxygen absorbent 5). A second difference is that carbon dioxide gas serving as the second specific gas is absorbed, oxygen serving as the specific gas is not absorbed and a carbon dioxide gas absorbent 130 serving as a second gas absorbent is disposed in the sealed space 8 between the first outer covering member 6a and the second outer covering member 6b. Here, a material of the carbon dioxide gas absorbent 130 is, for example, hydrated lime.

The packaging container 4 is unsealed when the intermediate product 101 for a vacuum insulation panel is attached to the object to be heat-insulated. After the packaging container 4 is unsealed, the oxygen sealed in the sealed space 8 is absorbed by the oxygen absorbent 5, and the carbon dioxide gas sealed in the space 109 in the container between the packaging container 4 and the oxygen absorbent 5 is absorbed by the carbon dioxide gas absorbent 130. Accordingly, the sealed space 8 is exhausted and then a vacuum insulation panel is obtained.

A flow of processing in the method of manufacturing the vacuum insulation panel according to the embodiment is basically the same as the flow of processing in the method of manufacturing the vacuum insulation panel according to Embodiment 1 described with reference to FIG. 4. In the processing in the method of manufacturing the vacuum insulation panel according to the embodiment, in step S103 of FIG. 4, in an atmosphere of oxygen serving as the specific gas, the carbon dioxide gas absorbent 130 serving as the second gas absorbent is sealed in the outer covering member 6, i.e., the space between the first outer covering member 6a and the second outer covering member 6b overlaid on the first outer covering member 6a together with the packaging container 4 to which the unsealing member 3 is attached and the core material 2, and thus, the intermediate product 101 for a vacuum insulation panel is formed. In forming the intermediate product 101 for a vacuum insulation panel, the manufacturing equipment 10 shown in FIG. 5 in Embodiment 1 is used.

In forming the intermediate product 101 for a vacuum insulation panel, the oxygen absorbent 5 is previously sealed in the packaging container 4. Specifically, in an atmosphere of carbon dioxide gas serving as the second specific gas, the oxygen absorbent 5 is disposed in the packaging container 4 and the packaging container 4 is sealed by thermal sealing.

Further, the present disclosure is not limited to the embodiments and may be appropriately modified without departing from the spirit of the present disclosure. In Embodiment 1, while the specific gas is oxygen and the gas absorbent is an oxygen absorbent, there is no limitation thereto. For example, the specific gas may be carbon dioxide gas and the gas absorbent may be a carbon dioxide gas absorbent. In addition, in Embodiment 2, while the specific gas is oxygen, the gas absorbent is an oxygen absorbent, the second specific gas different from the specific gas is carbon dioxide gas, and the second gas absorbent that absorbs the second specific gas is a carbon dioxide gas absorbent, there is no limitation thereto. For example, the specific gas may be carbon dioxide gas, the gas absorbent may be a carbon dioxide gas absorbent, the second specific gas different from the specific gas may be oxygen, and the second gas absorbent that absorbs the second specific gas may be an oxygen absorbent.

What is claimed is:

1. A method of manufacturing a vacuum insulation panel comprising:

sealing a first gas absorbent that absorbs a first specific gas in a container having gas barrier properties;

attaching an unsealing member configured to unseal the container to an outer side of the container in which the first gas absorbent is sealed when a pressing force is applied from an outside;

forming an intermediate product for the vacuum insulation panel by sealing the container to which the unsealing member is attached and a core material having heat insulation properties in an outer covering member having a sealed space under an atmosphere of the first specific gas; and unsealing the container by applying the pressing force to the unsealing member from the outside when the intermediate product for the vacuum insulation panel is folded in a desired shape, wherein a second specific gas different from the first specific gas is sealed in a space in the container sealing the first gas absorbent; and a second gas absorbent configured to absorb the second specific gas and not to absorb the first specific gas is disposed in the sealed space.

2. The method of manufacturing the vacuum insulation panel according to claim 1, wherein:

the unsealing member has a protrusion; and the protrusion opens a hole in the container to allow an inside and an outside of the container to communicate with each other when the pressing force is applied to the outer covering member from the outside.

3. The method of manufacturing the vacuum insulation panel according to claim 1, wherein the first specific gas is oxygen, the first gas absorbent is an oxygen absorbent, the second specific gas different from the first specific gas is carbon dioxide gas, and the second gas absorbent that absorbs the second specific gas is a carbon dioxide gas absorbent.

4. The method of manufacturing the vacuum insulation panel according to claim 1, wherein the first specific gas is carbon dioxide gas, the first gas absorbent is a carbon dioxide gas absorbent, the second specific gas different from the first specific gas is oxygen, and the second gas absorbent that absorbs the second specific gas is an oxygen absorbent.

* * * * *